United States Patent Office 3,210,309
Patented Oct. 5, 1965

3,210,309
CURING PHENOLIC RESINS WITH ALPHA-POLYOXYMETHYLENE
Edgar Bradbury Baker and Bruno Otto Krueger, Seattle, Wash., assignors to The Borden Company, New York, N.Y., a corporation of New Jersey
No Drawing. Filed June 21, 1960, Ser. No. 37,562
3 Claims. (Cl. 260—29.3)

This invention relates to the curing of phenolic resins.

In using such resins heretofore with paraformaldehyde, there has been difficulty in curing or gelling at a satisfactory rate without developing formaldehyde fumes to such extent as to interfere with the comfort or health of workers in large scale operations such as plying wood veneers.

We have now discovered compositions that provide the desired curing at room temperature or above at a good rate and reduce the fumes to about 20%–50% of the amount obtained with the usual paraformaldehyde curing.

Briefly stated, our invention comprises a solution of a condensation product of formaldehyde with phenol and resorcinol, alpha-polyoxymethylene, alkali in amount to establish the pH of the mixture on the alkaline side of neutrality, and suitably also a filler.

The invention comprises also the herein described processes of using and preparing the alpha-polyoxymethylene.

Tests were made with compositions that are comparable except that one composition containing paraformaldehyde and the other alpha-polyoxymethylene as the curing agent. The fuming of the compositions using paraformaldehyde was equivalent to the fuming obtained with a 1–2½% solution of formaldehyde. This was reduced to the equivalent of 0.5%–1.0% when the alpha-polyoxymethylene was used in place of the paraformaldehyde.

In making these and other fuming tests recorded herein, fuming is measured at intervals after formation of the mixture, as after 1, 2, or 3 hours. The fuming increases the longer the time subsequent to the mixing. The fuming is tested according to the following semi-quantitative method A–73. In this test a pH paper (pHydrion papers, A–B from Micro Essential Laboratories, Brooklyn, New York), is dipped into a freshly prepared 1% aqueous solution of sodium sulfite. This paper is then blotted and placed about 1–2 inches above the surface of the composition to be tested and the rate of development of blue color in the paper is compared with the rate of development by a solution of formaldehyde of known concentration to which the paper is exposed in like manner. The standard formaldehyde solutions are prepared at 0.5%, 1%, 2%, etc. concentrations, as required to make the rate of color development by the standard match that of the sample being tested. The results are recorded as percent concentration of formaldehyde equivalent in fuming to the sample.

As to materials used, we know of no substitute for the alpha-polyoxymethylene as the agent which gives the desired rate of cure at low temperatures and the low formaldehyde equivalent in the fuming test. The formula for alphapolyoxymethylene is generally considered to be HO—$(CH_2O)_n$—H in which $n$ is not less than 100. We have used a suitable grade prepared as follows: Celanese "coarse grade" powdered paraformaldehyde, from the oxidation of methane of natural gas, was used as the starting material. Of a given sample, one-half was heated in the course of several hours to 90° C. in the presence of 0.3% of a 48% hydrobromic acid solution while being mixed. It was held at 90° C. for two hours, and cooled to room temperature. The product may be neutralized by admixing alkali, e.g., 1% of calcium carbonate. Percentages here stated are on the weight of the paraformaldehyde. Four grams each of the untreated and treated material were then brought to 100 ml. volumes in an aqueous mix with 7.8 pH buffer (Clark and Lubs buffer, see Lange's Handbook of Chemistry, 9th, ed., page 951). The mixtures were maintained at 25° C. with intermittent shaking. After 40 minutes aliquot samples were filtered and tested for dissolved formaldehyde by the usual sodium sulfite method. The balance of the sample was filtered 90 minutes after the mixing, and the dissolved formaldehyde again determined. Results, expressed in percent of total formaldehyde dissolved at 40 and 90 minute intervals were:

| Material Tested | Percent of Total Aldehyde Dissolved | |
| --- | --- | --- |
| | 40 Minutes | 90 Minutes |
| Original paraformaldehyde | 48 | 80 |
| Treated para-alpha-polyoxymethylene | 8 | 17 |

Any Lewis acid, i.e., electron acceptor, such as borontrifluoride may be substituted for the hydrobromic acid, the period of heating being about 0.5–8 hours and the temperature about 60°–110° C. In general, the proportion of the acidic material acid is about 0.01–0.5 part for 100 of the paraformaldehyde. Larger amounts are uneconomical and unnecessary. Other Lewis acids, compounds which coordinate with an active hydrogen, to enhance the acidity in what is normally a non-acidic compound such as ether, that we may use are all halides of aluminum, stannic tin, ferric iron, zinc, and the other elements of Group III of the Periodic Table of the Chemical Elements; suitable examples are aluminum chloride, stannic chloride, and the borontrifluoride.

The resin used is a phenol-resorcinol-formaldehyde condensate in resinous form that is further condensable, i.e., curable, by a usual curing agent for such resins. Proportions of the phenol to resorcinol may vary, as within the range approximately 25–75 parts by weight of the phenol for 100 parts total of the phenol and resorcinol. The proportion of formaldehyde represented in the condensation product may vary also, as from about 0.5–0.9 and for best results 0.55–0.7 mole for 1 mole of the phenolic material, i.e., total of phenol and resorcinol. The condensation is effected with an alkali catalyst and the product is known as an alkali novolak.

The resin solution is adjusted by admixing alkali in amount to establish the pH on the alkaline side of 7, as within the range about 7.1–9 which is suitable for storing and handling of the resin and for final curing of the resin adhesive. The alkali is selected in amount within this range, to give the gelling time required for a given use. Suitable alkalies are lithium, sodium, or potassium hydroxide. The sodium hydroxide is economical, satisfactory and preferred. Other water soluble, strong alkalies of this kind do not give advantages off-setting their higher costs.

Various fillers and miscellaneous materials that are commonly used in adhesives for plywood or the like may be and suitably are incorporated in usual kind and proportion. Examples of fillers that illustrate the class that we use are walnut or other nut shell flour, ground Douglas fir bark, wood flour, fine asbestos, or powdered clay.

In making the finished glue there are incorporated the various components in proportions that may be varied somewhat to suit the particular needs of the adhesive in the use intended. Among these components is any $C_1$–$C_2$ monohydric alcohol to replace a part of the water as solvent. Suitable ranges are as follows.

| Component: | Parts by wt. for 100 of the adhesive composition |
|---|---|
| Phenol-resorcinol-formaldehyde condensate, solids basis | 35–55 |
| Alpha-polyoxymethylene, ground | 5–15 |
| Filler | 0–15 |
| Alcohol | 0–15 |
| Water to make 100. | |

The proportion of the alpha-polyoxymethylene is about 10–40 parts for 100 dry weight of the said condensate.

A suitable proportion of total solids for adhesive use is 40–70 parts for 100 total of the aqueous composition.

The invention will be further illustrated by description in connection with the following specific examples of the practice of it. In these examples, as elsewhere herein, proportions are expressed as parts by weight unless specifically stated to the contrary and the alpha-polyoxymethylene used in these examples was made by heating the powdered paraformaldehyde with hydrobromic acid as described above.

*Example 1*

A resinous phenol-resorcinol-formaldehyde condensate in further condensable form was prepared from the following materials.

| Component: | Parts by weight |
|---|---|
| (1) Phenol (87%) | 100 |
| (2) Formaldehyde (1% methanol, 37% aq. sol.) | 150 |
| (3) Sodium hydroxide (50% solution) | 3.1 |
| (4) Resorcinol | 96 |
| (5) Additional sodium hydroxide (50% solution) | 7.4 |
| Total of above | 356.5 |
| (6) Distillate (mostly water) | 13.6 |
| Remaining weight of adhesive | 342.9 |

Components 1, 2 and 3 were charged to a still with reflux condenser, heated to an elevated temperature, here 90° C., and held at about that temperature for 1 hour. The mix was then cooled to below 70° C., actually about 60° C., and components 4 and 5 were then admixed. The batch was next heated to 85° C. and held at that temperature for about 1 hour until a Gardner (i.e., Gardner-Holdt) viscosity of "F" was reached. The whole was then cooled to 45°–50° C. and 13.6 parts of water were distilled out under vacuum. The remaining material (342.9 parts) was cooled. It had a viscosity of 250 cps. at 21° C.

This cooled material was divided into two equal halves. The pH of each half was adjusted by the addition of a 50% aqueous solution of sodium hydroxide in amount to establish the pH shown in the following table and to make the resulting mixture gel at 21° C. in 4.5–6 hours after admixing the aldehyde component. There was then stirred in as the aldehyde component either alpha-polyoxymethylene or paraformaldehyde (for comparison) and also fillers in the proportions shown, to complete the adhesive composition.

| Component of Adhesive | Parts | |
|---|---|---|
| | Sample A | Sample B |
| The above phenol-resorcinol-formaldehyde condensate | 100 | 100 |
| Alpha-polyoxymethylene, powder | 10 | |
| Powdered paraformaldehyde | | 10 |
| Fir flour | 5 | 5 |
| Walnut shell flour | 5 | 5 |
| pH of resulting mixture at 21° C | 8.0 | 7.7 |
| Gel time, hours | 5.5 | 5.2 |
| Fumes equivalent to formaldehyde solution of concentration, percent | 0.5 | 1 |

The fuming of the two solutions A and B was tested 1, 2 and 3 hours after the mixing. The results shown in the last line of the table are the average of the three tests on each specimen. Although the results, even with the paraformaldehyde, are better than normal, the substitution of the alpha-polyoxymethylene showed a reduction of half in the fuming.

The adhesive, when applied between wood surfaces, cured at any temperature within the range 70°–190° F. that was tested.

*Example 2*

A resin solution was made as follows.

| Materials: | Parts by weight |
|---|---|
| (1) 87% phenol | 1645 |
| (2) 37% formaldehyde (0.7% methanol) | 1250 |
| (3) 50% caustic soda solution | 80 |
| (4) Water | 310 |
| (5) Resorcinol | 1200 |
| (6) Alcohol,[1] denatured | 300 |
| (7) Water | 200 |

[1] See the following table:

| | |
|---|---|
| 95% ethanol | 660 |
| Ethyl acetate | 37 |
| Aviation gasoline | 6 |

Charge (1) through (4) to mixer. Heat to 90° C., cooling as necessary to balance the exotherm. Hold 30 minutes. Cool. Charge (5). Reheat to reflux. Hold for several hours until a Gardner viscosity of "V" is reached. Cool. Charge (6) and (7). The proportion of ingredients in 6 (the denatured alcohol) is shown in the last three lines of the table.

The result is a resin solution of 54.8% solids with a viscosity of 364 cps. at 21° C. A part of this was compounded and cured with the alpha-polyoxymethylene and a part with paraformaldehyde as a control.

| | Control | Alpha-polyoxymethylene |
|---|---|---|
| Above resin, wet wt parts | 99.8 | 99.0 |
| 50% Caustic soda solution do | 0.2 | 1.0 |
| pH | 7.5 | 7.7 |
| Ground paraformaldehyde parts | 10.4 | |
| Ground alpha-polyoxymethylene [1] do | | 10.4 |
| Filler [2] do | 9.6 | 9.6 |
| Gel time at 21° C hours | 5½ | 6 |

[1] This alpha-polyoxymethylene was prepared by heating powdered paraformaldehyde with mixing to 90° C. in the presence of 0.3% of hydrobromic acid, 48% solution, holding for 2 hours, and then cooling.
[2] This filler is 50% fir flour and 50% nut shell flour.

| Time after mixing | Fuming=Formaldehyde Solution of Condensation | |
|---|---|---|
| | Control, percent | Alpha-polyoxymethylene, percent |
| 1 hour | 1 | Less than ½ |
| 2 hours | 2½ | 1. |
| 3 hours | 2½ | 1. |

The quantitative results will vary somewhat with the activity of paraformaldehyde used.

Those compositions of Examples 1 and 2 containing the alpha-polyoxymethylene as the curing agent, when used in gluing softwood lumber laminates in the usual lumber laminating operations, gave good bonding and generally satisfactory results, with the reduced fuming shown in the tables.

It is to be understood that it is intended to cover all changes and modifications of the examples of the invention herein chosen for the purpose of illustration which do not constitute departures from the spirit and scope of the invention.

We claim:
1. The process of making a curable resin composition comprising the steps of:
   (1) mixing (a) an aqueous solution of alkali condensed phenol-resorcinol-formaldehyde novolak resin with (b) a curing composition of alpha-polyoxymethylene of the formula $HO—(CH_2O)_n—H$ in which the approximate value of $n$ is not less than 100, the proportion of said alpha-polyoxymethylene being about 10–40 parts for 100 parts dry weight of the resin, and (c) an alkali metal hydroxide in amount to establish the pH of the whole mixture at about 7.1–9, and
   (2) curing said resin.
2. The process of claim 1, the proportions by weight of the components represented in the said resin being about 25–75 parts of phenol to 100 parts total resorcinol and phenol and 0.5–0.9 mol of formaldehyde for 1 mol total of phenol and resorcinol, and said curing being at temperatures in the range of 70° F.–190° F.
3. A curable adhesive comprising an aqueous solution of about 100 parts dry weight of alkali condensed phenol-resorcinol-formaldehyde novolak resin, admixed alpha-polyoxymethylene, as curing agent, of the formula $HO—(CH_2O)_n—H$ in which $n$ is not less than 100, and an alkali metal hydroxide in amount to establish the pH of the whole mixture at about 7.1–9, the proportion of the alpha-polyoxymethylene being about 10–40 parts for 100 parts dry weight of the resin.

References Cited by the Examiner
UNITED STATES PATENTS

| | | | |
|---|---|---|---|
| 1,802,390 | 4/31 | Novotny | 260—54 |
| 2,369,504 | 2/45 | Walker | 260—615.5 |
| 2,411,557 | 11/46 | Schuh | 260—59 |
| 2,519,550 | 8/50 | Craven | 260—340 |
| 2,606,888 | 8/52 | Williams et al. | 260—59 |
| 2,606,889 | 8/52 | Ward et al. | 260—59 |
| 2,768,994 | 10/56 | MacDonald | 260—67 |
| 2,828,286 | 3/58 | MacDonald | 260—67 |
| 2,947,728 | 8/60 | Bartz | 260—615.5 |

OTHER REFERENCES

Formaldehyde, Walker, 2d ed. (1953), pp. 129–131.
Formaldehyde, Walker, 3d ed. (1964), p. 158.

WILLIAM H. SHORT, *Primary Examiner.*
MILTON STERMAN, *Examiner.*